Figure 1:
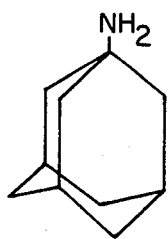
Figure 1:
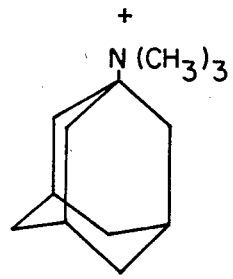
Figure 1:
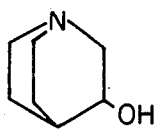
Figure 1:
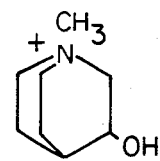
Figure 1:
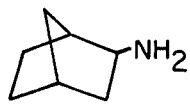
Figure 1:
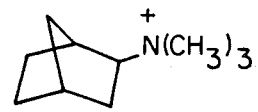

United States Patent [19]

Zones

[11] Patent Number: 4,544,538
[45] Date of Patent: Oct. 1, 1985

[54] ZEOLITE SSZ-13 AND ITS METHOD OF PREPARATION

[75] Inventor: Stacey I. Zones, San Francisco, Calif.

[73] Assignee: Chevron Research Company, San Francisco, Calif.

[21] Appl. No.: 519,954

[22] Filed: Aug. 3, 1983

Related U.S. Application Data

[63] Continuation-in-part of Ser. No. 397,007, Jul. 9, 1982, abandoned.

[51] Int. Cl.[4] .............................................. C01B 33/20
[52] U.S. Cl. .................................... 423/326; 423/328; 423/329; 502/60; 502/61; 502/62; 502/77
[58] Field of Search .................... 423/328, 329, 326; 502/60-62

[56] References Cited

U.S. PATENT DOCUMENTS

| | | | |
|---|---|---|---|
| 3,030,181 | 4/1962 | Milton | 423/329 |
| 3,056,654 | 10/1962 | Barrer et al. | 423/329 |
| 3,248,170 | 4/1966 | Kvetinskas | 502/60 |
| 3,649,178 | 3/1972 | Wang et al. | 423/329 |
| 3,950,496 | 4/1976 | Ciric | 423/328 |
| 4,061,717 | 12/1977 | Kerr et al. | 423/329 |
| 4,331,643 | 5/1982 | Rubin et al. | 423/329 |
| 4,372,930 | 2/1983 | Short et al. | 423/326 |
| 4,414,189 | 11/1983 | Kokotailo et al. | 423/328 |
| 4,419,220 | 12/1983 | LaPierre et al. | 208/111 |
| 4,431,746 | 2/1984 | Rollmann | 502/77 |
| 4,496,786 | 1/1985 | Santilli et al. | 585/640 |
| 4,503,024 | 3/1985 | Bourgogne et al. | 423/328 |

FOREIGN PATENT DOCUMENTS 868846 5/1961 United Kingdom .............. 423/329

OTHER PUBLICATIONS

R. M. Barrer et al., "The Hydrothermal Chemistry of the Silicates: Part VII* Synthetic Potassium Aluminosilicates", J. Chem. Soc., pp. 2882–2903 (1956).

W. H. Meier and P. H. Olson *Atlas of Zeolite Structure Types*, (1978), pp. 25, 69, 90–93, 95–99.

Primary Examiner—John Doll
Assistant Examiner—Jackson Leeds
Attorney, Agent, or Firm—S. R. LaPaglia; W. K. Turner; V. J. Cavalieri

[57] ABSTRACT

A crystalline zeolite, SSZ-13, is prepared from organic nitrogen-containing cations derived from 1-adamantamine, 3-quinuclidinol, and 2-exo-aminonorbornane,

10 Claims, 1 Drawing Figure

1-ADAMANTAMINE

TEMPLATE A

3-QUINUCLIDINOL

TEMPLATE B

2-EXO-AMINONORBORNANE

TEMPLATE C

1-ADAMANTAMINE

TEMPLATE A

3-QUINUCLIDINOL

TEMPLATE B

2-EXO-AMINONORBORNANE

TEMPLATE C

ZEOLITE SSZ-13 AND ITS METHOD OF PREPARATION

CROSS-REFERENCE TO RELATED APPLICATIONS

This application is a continuation-in-part of my co-pending application Ser. No. 397,007, filed on July 9, 1982 now abandoned, the disclosure of which is incorporated herein by specific reference.

TECHNICAL FIELD

Natural and synthetic aluminosilicates are important and useful compositions. Many of these aluminosilicates are porous and have definite, distinct crystal structures as determined by X-ray diffraction. Within the crystals are a large number of cavities and pores whose dimensions and shapes vary from zeolite to zeolite. Variations in pore dimensions and shapes cause variations in the adsorptive and catalytic properties of the zeolites. Only molecules of certain dimensions and shapes are able to fit into the pores of a particular zeolite while other molecules of larger dimensions or different shapes are unable to penetrate the zeolite crystals.

Because of their unique molecular sieving characteristics, as well as their potentially acidic nature, zeolites are especially useful in hydrocarbon processing as adsorbents, and, as catalysts, for cracking, reforming, and other hydrocarbon conversion reactions. Although many different crystalline aluminosilicates have been prepared and tested, the search for new zeolites which can be used in hydrocarbon and chemical processing continues.

I have discovered a novel family of crystalline aluminosilicate zeolites, hereinafter designated "Zeolite SSZ-13" or simply "SSZ-13", and methods for their preparation and use.

In recent years, many crystalline aluminosilicates having desirable adsorption and catalytic properties have been prepared. Typically, zeolites are prepared from reaction mixtures having sources of alkali or alkaline earth metal oxides, silica, and alumina. More recently, "nitrogenous zeolites" have been prepared from reaction mixtures containing an organic species, usually a nitrogen compound. Depending upon the reaction conditions and the composition of the reaction mixture, different zeolites can be formed even if the same organic species are used. For example, zeolites ZK-4, ZSM-4, faujasite and PHI, have all been prepared from solutions containing tetramethylammonium cations.

Although most experiments reported as producing nitrogenous zeolites have used fairly simple organic species such as tetraalkylammonium cations or alkylenediamines, several experiments are reported as using more complex organic species. U.S. Pat. No. 3,692,470, Ciric, Sept. 19, 1972, discloses preparing ZSM-10 from 1,4-dimethyl-1,4-diazoniabicyclo[2.2.2]octane. U.S. Pat. No. 3,832,449, Rosinski et al., Aug. 27, 1974, discloses preparing ZSM-12 from the reaction products of alkylene dihalides with complex amines or nitrogen heterocycles. U.S. Pat. No. 3,950,496, Ciric, Apr. 13, 1976, discloses preparing ZSM-18 from "tris" ammonium hydroxide (1,3,4,6,7,9-hexahydro-2,2,5,5,8,8-hexamethyl-2H-benzo-[1,2-C:3,4-C':5,6-C"]tripyrolium trihydroxide). U.S. Pat. No. 4,018,870, Whittam, Apr. 19, 1977, discloses preparing AG5 and AG6 using nitrogenous basic dyes. And, U.S. Pat. No. 4,285,922, Audeh, Aug. 25, 1981, discloses preparing ZSM-5 using 1-alkyl, 4 aza, 1-azonia-bicyclo(2,2,2)octane, 4-oxide halides.

Chabazite is a natural zeolite with the approximate formula $Ca_6Al_{12}Si_{24}O_{72}$. Three synthetic forms of chabazite are described in "Zeolite Molecular Sieves", by D. W. Breck, published in 1973 by John Wiley & Sons, the complete disclosure of which is incorporated herein by specific reference. This publication is referred to herein as "Breck". The three synthetic forms reported by Breck are: Zeolite "K-G", described in J. Chem. Soc., p. 2822 (1956), Barrer et al; Zeolite D, described in British Patent No. 868,846 (1961); and Zeolite R, described in U.S. Pat. No. 3,030,181 (1962). Chabazite is also discussed in "Atlas of Zeolite Structure Types" (1978) by W. H. Meier and D. H. Olson.

The K-G zeolite material reported in the J. Chem. Soc. article by Barrer et al is a potassium form having a silica:alumina mole ratio of 2.3:1 to 4.15:1. The zeolite D material reported in British Patent No. 868,846 is a sodium-potassium form having a silica:alumina mole ratio of 4.5:1 to 4.9:1. The zeolite R material reported in U.S. Pat. No. 3,030,181 is a sodium form which has a silica:alumina mole ratio of 3.45:1 to 3.65:1.

Citation No. 93:66052y, in Volume 93 (1980) of Chemical Abstracts, concerns a Russian Language article by Tsitsishrili et al in *Soobsch. Akad. Nauk. Gruz.,* SSR 1980, 97(3) 621-4.

This article teaches that the presence of tetramethylammonium ions in a reaction mixture containing $K_2O—Na_2O—SiO_2—Al_2O_3—H_2O$ promotes the crystallization of chabazite. In the absence of the tetramethylammonium ion in the reaction mixture, phillipsite is obtained. The zeolite obtained by the crystallization procedure has a $SiO_2:Al_2O_3$ mole ratio of 4.23. The article states that the tetramethylammonium ion has a great influence on the direction of crystallization of the reaction mixture, although it may not even enter into the composition of the zeolites.

TECHNICAL DISCLOSURE

My invention is a zeolite having a mole ratio of an oxide selected from silicon oxide, germanium oxide, and mixtures thereof to an oxide selected from aluminum oxide, gallium oxide, and mixtures thereof greater than about 5:1 and having the X-ray diffraction lines of Table 1. The zeolite further has a composition, as synthesized and in the anhydrous state, in terms of mole ratios of oxides as follows: $(0.5 \text{ to } 1.4)R_2O:(0 \text{ to } 0.50)M_2O:W_2O_3$: (greater than 5)$YO_2$ wherein M is an alkali metal cation, W is selected from aluminum, gallium, and mixtures thereof, Y is selected from silicon, germanium and mixtures thereof, and R is an organic cation. SSZ-13 zeolites can have a $YO_2:W_2O_3$ mole ratio greater than about 5:1. As prepared, the silica:alumina mole ratio is typically in the range of 8:1 to about 50:1; higher mole ratios can be obtained by varying the relative ratios of reactants. Higher mole ratios can also be obtained by treating the zeolite with chelating agents or acids to extract aluminum from the zeolite lattice. The silica:alumina mole ratio can also be increased by using silicon and carbon halides and similar compounds. Preferably, SSZ-13 is an aluminosilicate wherein W is aluminum and Y is silicon.

My invention also involves a method for preparing SSZ-13 zeolites, comprising preparing an aqueous mixture containing sources of an organic nitrogen-containing compound, an oxide selected from aluminum oxide, gallium oxide, and mixtures thereof, and an oxide selected from silicon oxide, germanium oxide, and mixtures thereof, and having a composition, in terms of mole ratios of oxides, falling within the following ranges: $YO_2/W_2O_3$, 5:1 to 350:1; and $R_2O/W_2O_3$ 0.5:1 to 40:1; wherein Y is selected from silicon, germanium, and mixtures thereof, W is selected from aluminum, gallium and mixtures thereof, and R is an organic cation; maintaining the mixture at a temperature of at least 100° C. until the crystals of said zeolite are formed; and recovering said crystals.

In a preferred embodiment, the SSZ-13 contains silica, and is prepared from a reaction mixture which includes colloidal silica. I have found that use of an aqueous colloidal suspension of silica in the reaction mixture to provide a silica source allows production of SSZ-13 having a relatively high silica:alumina mole ratio, and that use of colloidal silica in the reaction mixture also allows a relatively smaller concentration of hydroxide ion to be present in the reaction mixture. Preferably, the silica source is an aqueous silica suspension such as Ludox AS-30, a commercially available colloidal silica suspension.

Uncalcined SSZ-13 zeolites, as prepared (with the organic templating component present in the crystal structure), have a crystalline structure whose X-ray powder diffraction pattern shows the characteristic lines shown in Table I below:

TABLE 1

| $2\theta$ | d(A) | 100 $I/I_0$ |
|---|---|---|
| 9.57 | 9.24 | 61 |
| 14.06 | 6.30 | 21 |
| 16.23 | 5.46 | 80 |
| 17.82 | 4.98 | 24 |
| 20.87 | 4.26 | 100 |
| 22.14 | 4.01 | 9 |
| 22.72 | 3.91 | 8 |
| 25.01 | 3.56 | 69 |
| 26.30 | 3.589 | 18 |
| 31.00 | 2.885 | 47 |
| 31.29 | 2.859 | 21 |

The X-ray diffraction pattern of SSZ-13 is completely indexed on a rhombohedral lattice. SSZ-13 has been found to possess the crystal structure of chabazite. The rhombohedral unit cell of SSZ-13 shows significant change between the as-prepared condition (with the organic templating component present in the structure) and the condition after calcination. The rhombohedral lattice provides appreciable flexibility. With the organic templating species present in the crystal structure, the volume of the unit cell is 7 cubic Angstroms (one percent) larger than the volume of the unit cell after calcination. Calcined SSZ-13 zeolites have a crystal structure whose X-ray diffraction pattern shows the characteristic lines shown in Table 2 below:

TABLE 2

| $2\theta$ | d(A) | 100 $I/I_0$ |
|---|---|---|
| 9.62 | 9.19 | 100 |
| 13.04 | 6.79 | 32 |
| 16.22 | 5.46 | 18 |
| 18.00 | 4.93 | 16 |
| 20.87 | 4.26 | 50 |
| 23.36 | 3.808 | 6 |
| 25.23 | 3.530 | 18 |
| 26.26 | 3.394 | 11 |
| 31.02 | 2.883 | 27 |
| 31.44 | 2.846 | 13 |

The X-ray powder diffraction patterns were determined by standard techniques. The radiation was the K-alpha/doublet of copper and a scintillation counter spectrometer with a strip-chart pen recorder was used. The peak heights I and their positions, in degrees, $2\theta$, where $\theta$ is the Bragg angle, were read from the spectrometer chart. From these measured values, the relative intensities, 100 $I/I_0$, where $I_0$ is the intensity of the strongest line or peak, and d, the interplanar spacing in Angstroms corresponding to the recorded lines, can be calculated. The X-ray diffraction pattern of Tables 1 and 2 is characteristic of all species of SSZ-13 family compositions. The zeolite produced by exchanging the metal or other cations present in the zeolite with various other cations yields substantially the same diffraction pattern as is given in Table 2, although there can be minor shifts in interplanar spacing and variations in relative intensity. Minor variations in the diffraction pattern given in Tables 1 and 2 can also result from variations in the organic compound used in the preparation and from variations in the silica-to-alumina mole ratio from sample to sample. Notwithstanding these minor perturbations, the basic crystal structures for the as-prepared condition and the calcined condition remain substantially unchanged.

SSZ-13 zeolites can be suitably prepared from an aqueous solution containing sources of an alkali metal oxide, an organic compound, an oxide of aluminum or gallium, or mixture of the two, and an oxide of silicon or germanium, or mixture of the two. The reaction mixture should have a composition in terms of mole ratios of oxides falling within the following ranges:

| | Broad | Preferred |
|---|---|---|
| $YO_2/W_2O_3$ | 5–350 | 12–200 |
| $M_2O/W_2O_3$ | 0.5–20 | 1–17 |
| $R_2O/W_2O_3$ | 0.5–40 | 5–25 |
| $MCl/W_2O_3$ | 20–200 | 50–150 | wherein R is as disclosed below, Y is silicon, germanium or both, and W is aluminum, gallium or both. M is an alkali metal, preferably sodium or potassium. Typically, an alkali metal hydroxide or alkali metal halide is used in the reaction mixture; however, these components can be omitted so long as the equivalent basicity is maintained. The organic compound can provide hydroxide ion. The $OH^-/YO_2$ mole ratio to produce SSZ-13 having silica:alumina mole ratios of less than about 20:1 is above about 0.95 and is preferably in the range of 0.95 to 1.10. To prepare high silica content SSZ-13, the $OH^-/YO_2$ mole ratio is below about 0.95.

The organic component of the crystallization mixture is typically a bicyclo heteroatom compound. The heteroatom is preferably nitrogen. The preferred organic species are derivatives of either 1-adamantamine, 3-quinuclidinol, or 2-exo-aminonorbornane. The quaternary lower alkylammonium cation derivatives of these compounds are especially preferred. Methyl and other lower alkyl derivatives can be made using standard synthetic procedures.

The reaction mixture is prepared using standard zeolitic preparation techniques. Typical sources of aluminum oxide for the reaction mixture include aluminates, alumina, and aluminum compounds such as $AlCl_3$ and $Al_2(SO_4)_3$. Typical sources of silicon oxide include silicates, silica hydrogel, silicic acid, colloidal silica, tetraalkyl orthosilicates, and silica hydroxides. Gallium and germanium can be added in forms corresponding to their aluminum and silicon counterparts. Salts, particularly alkali metal halides such as sodium chloride, can be added to or formed in the reaction mixture. They are disclosed in the literature as facilitating the crystallization of zeolites while preventing silica occlusion in the lattice.

The reaction mixture is maintained at an elevated temperature until the crystals of the zeolite are formed. The temperatures during the hydrothermal crystallization step are typically maintained from about 100° C. to about 235° C., preferably from about 120° C. to about 200° C. and most preferably from about 130° C. to about 165° C. The crystallization period is typically greater than 3 days and preferably from about 7 days to about 50 days.

The hydrothermal crystallization is conducted under pressure and usually in an autoclave so that the reaction mixture is subject to autogenous pressure. The reaction mixture can be stirred during crystallization.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized, SSZ-13 zeolite crystals. The drying step can be performed at atmospheric or subatmospheric pressures.

During the hydrothermal crystallization step, the SSZ-13 crystals can be allowed to nucleate spontaneously from the reaction mixture. The reaction mixture can also be seeded with SSZ-13 crystals both to direct, and accelerate the crystallization, as well as to minimize the formation of undesired aluminosilicate contaminants. If the reaction mixture is seeded with SSZ-13 crystals, the concentration of the organic compound can be greatly reduced or eliminated, but it is preferred to have some organic compound present, e.g., an alcohol.

The synthetic SSZ-13 zeolites can be used as synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA, or dilute acid solutions to increase the silica:alumina mole ratio. I have found that SSZ-13 synthesized with a relatively high silica:alumina mole ratio is more active for a cracking activity microtest than SSZ-13 synthesized with a relatively lower silica:alumina mole ratio and subsequently acid leached with HCl to raise its silica:alumina mole ratio to the same relatively high level. The zeolite can also be steamed; steaming stabilizes the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, Fe and Co are particularly preferred.

The hydrogen, ammonium, and metal components can be exchanged into the zeolite. The zeolite can also be impregnated with the metals, or, the metals can be physically intimately admixed with the zeolite using standard methods known to the art. And, the metals can be occluded in the crystal lattice by having the desired metals present as ions in the reaction mixture from which the SSZ-13 zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structure.

The SSZ-13 aluminosilicate can be formed into a wide variety of physical shapes. Generally speaking, the zeolite can be in the form of a powder, a granule, or a molded product, such as extrudate having particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may occur naturally or may be in the form of gelatinous precipitates, sols or gels including mixtures of silica and metal oxides. Use of an active material in conjunction with the synthetic zeolite, i.e., combined therewith, tends to improve the conversion and selectivity of the catalyst in certain organic conversion processes. Inactive materials can serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powder-like materials which cause problems in processing.

Naturally occurring clays which can be composited with the synthetic zeolites of this invention include the montmorillonite and kaolin families, which families include the sub-bentonites, and the kaolins, in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

In addition to the foregoing materials, the SSZ-13 zeolites can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The SSZ-13 zeolites can also be composited with other zeolites such as synthetic and natural faujasites (e.g., X and Y), erionites, and mordenites. They can also be composited with purely synthetic zeolites such as those of the ZSM series. The combination of zeolites can also be composited in a porous inorganic matrix.

SSZ-13 zeolites are useful in hydrocarbon conversion reactions. Hydrocarbon conversion reactions are chemical and catalytic processes in which carbon containing compounds are changed to different carbon containing compounds. Examples of hydrocarbon conversion reactions include catalytic cracking, hydrocracking, and olefin and aromatics formation reactions. The catalysts are useful in other petroleum refining and hydrocarbon conversion reactions such as isomerizing n-paraffins and naphthenes, polymerizing and oligomerizing olefinic or acetylenic compounds such as isobutylene and butene-1, reforming, alkylating, isomerizing polyalkyl substituted aromatics (e.g., ortho xylene), and disproportionating aromatics (e.g., toluene) to provide a mixture of benzene, xylenes and higher methylbenzenes. The SSZ-13 catalysts have high selectivity, and under hydrocarbon conversion conditions can provide a high percentage of desired products relative to total products.

SSZ-13 zeolites can be used in processing hydrocarbonaceous feedstocks. Hydrocarbonaceous feedstocks contain carbon compounds and can be from many different sources, e.g., virgin petroleum fractions, recycle petroleum fractions, shale oil, liquefied coal, tar sand oil, and in general any carbon containing fluid susceptible to zeolitic catalytic reactions. Depending on the type of processing the hydrocarbonaceous feed is to undergo, the feed can be metal containing or without metals, it can also have high or low nitrogen or sulfur impurities. It can be appreciated, however, that in general processing will be more efficient (and the catalyst more active) the lower the metal, nitrogen or sulfur content of the feedstock.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Using SSZ-13 catalysts which contain hydrogenation components, heavy petroleum residual stocks, cyclic stocks, and other hydrocrackable charge stocks can be hydrocracked at temperatures from 175° C. to 485° C. using molar ratios of hydrogen to hydrocarbon charge from 1 to 100. The pressure can vary from 0.5 to 350 bar and the liquid hourly space velocity from 0.1 to 30. For these purposes, the SSZ-13 catalyst can be composited with mixtures of inorganic oxide supports as well as with faujasites such as X and Y.

Hydrocarbon cracking stocks can be catalytically cracked using SSZ-13 at liquid hourly space velocities from 0.5 to 50, temperatures from about 260° F. to 625° F., and pressures from subatmospheric to several hundred atmospheres.

SSZ-13 can be used to dewax hydrocarbonaceous feeds by selectively removing straight chain paraffins. The process conditions can be those of hydrodewaxing—a mild hydrocracking—or they can be at lower pressures in the absence of hydrogen. Dewaxing in the absence of hydrogen at pressures less than 30 bar, and preferably less than 15 bar, is preferred as significant amounts of olefins can be obtained from the cracked paraffins.

SSZ-13 can also be used in reforming reactions using temperatures from 315° C. to 595° C., pressures from 30 to 100 bar, and liquid hourly space velocities from 0.1 to 20. The hydrogen to hydrocarbon mole ratio can be generally from 1 to 20.

The catalyst can also be used to hydroisomerize normal paraffins, when provided with a hydrogenation component, e.g., platinum. Hydroisomerization is carried out at temperatures from 90° C. to 370° C., and liquid hourly space velocities from 0.01 and 5. The hydrogen to hydrocarbon mole ratio is typically from 1:1 to 5:1. Additionally, the catalyst can be used to isomerize and polymerize olefins using temperatures from 0° C. to 260° C.

Other reactions which can be accomplished using the catalyst of this invention containing a metal, e.g., platinum, include hydrogenation-dehydrogenation reactions, denitrogenation and desulfurization reactions.

SSZ-13 can be used in hydrocarbon conversion reactions with active or inactive supports, with organic or inorganic binders, and with and without added metals. These reactions are well known to the art as are the reaction conditions.

SSZ-13 can also be used as an adsorbent, a filler in paper products, and as a water-softening agent in detergents.

FIGURE

FIG. 1 illustrates the three primary sources of organic species for solutions from which SSZ-13 is prepared, and their trimethyl ammonium cations as prepared in the Examples.

EXAMPLES

Example 1

Preparation of Organic Template Species (a) N,N,N-trimethyl-1-adamantammonium iodide 1-Adamantamine (Aldrich Chemical Company), 10 g, was dissolved in 60 ml of dimethyl formamide. 29 g of tributylamine was added; 28.4 g of methyl iodide was added dropwise while the reaction was stirred in an ice bath. The next day, large plate-like crystals had formed. These were filtered after 5 days and washed with diethyl ether. Microanalysis for C, H, and N showed the product to be the trimethyl derivative, N,N,N-trimethyl-1-adamantammonium iodide.

(b) N-methyl-3-quinuclidinol iodide

3-Quinuclidinol (Aldrich Chemical Company), 20 g, was dissolved in 150 ml of CHCl$_3$ (reagent grade). The solution was cooled in an ice bath and 25.56 g of methyl iodide was added dropwise with stirring. Copious solids were produced which were filtered the next day and washed with diethyl ether. Microanalysis for C, H, and N confirmed the formation of the quaternary ammonium salt, N-methyl-3-quinuclidinol iodide.

(c) N,N,N-trimethyl-2-ammonium exonorborane

2-Exoaminonorbornane (Aldrich Chemical Company), 11.1 g, was dissolved in 50 cc dimethyl formamide, and 37.1 g of tributylamine was stirred in. Methyl iodide, 42.6 g, was added dropwise while the reaction mixture was kept in an ice bath. After 5 hours of stirring, the reaction was filtered and the fine crystals were washed with acetone. Microanalysis for C, H, and N gave a good analysis for N,N,N-trimethyl-2-ammonium exonorbornane.

Example 2

The following procedure illustrates the preparation of SSZ-13, using N,N,N-trimethyl-1-adamantammonium iodide as the organic templating species.

Into a 23 ml Teflon cup designed to fit into a stainless steel pressure reactor (Parr Chemical Company), a first solution was prepared by adding 5 g of sodium silicate solution (0.45 g Na$_2$O, 1.46 g SiO$_2$, 3.10 g H$_2$O), 6 ml of H$_2$O, and 1.56 g of N,N,N-trimethyl-1-adamantammonium iodide. A second solution prepared using 0.24 g of Al$_2$(SO$_4$)$_3$.16H$_2$O and 0.67 g of concentrated (50% by weight) NaOH solution in 6 ml of water was added to the first solution. The reactants were stirred until a homogeneous milky solution was obtained. The reactor was closed and heated for 6 days at 140° C. and autogenous pressure. Upon cooling, the contents of the Teflon cup were poured into a filter and the resulting solids were washed five times with deionized H$_2$O followed by once each with methanol and acetone. The X-ray diffraction pattern for the air-dried zeolite is shown in Table 3. The pattern for the calcined zeolite is shown in Table 4.

TABLE 3

X-RAY DIFFRACTION PATTERN OF PRODUCT OF EXAMPLE 2

| 2θ | d/n | 100 I/I$_0$ |
|---|---|---|
| 9.58 | 9.23 | 57 |
| 12.45* | 7.11 | 5 |
| 13.00 | 6.81 | 8 |
| 14.04 | 6.31 | 20 |
| 15.90** | 5.57 | 17 |
| 16.20 | 5.47 | 72 |
| 17.80 | 4.98 | 21 |
| 20.80 | 4.27 | 100 |
| 21.70* | 4.10 | 4 |
| 22.12 | 4.02 | 8 |
| 22.68 | 3.92 | 8 |
| 23.29 | 3.82 | 5 |
| 23.48 | 3.79 | 5 |
| 24.38 | 3.65 | 4 |
| 24.96 | 3.57 | 38 |
| 25.37 | 3.51 | 4 |
| 26.12 | 3.41 | 26 |
| 27.90 | 3.20 | 7 |
| 28.18* | 3.17 | 12 |
| 28.30 | 3.15 | 10 |
| 30.92 | 2.89 | 54 |

*Attributed to small amount of impurity - cubic zeolite P
**Believed to be extraneous to SSZ-13 structure

TABLE 4

X-RAY DIFFRACTION PATTERN OF CALCINED PRODUCT OF EXAMPLE 2

| 2θ | d/n | 100 I/I$_0$ |
|---|---|---|
| 9.55 | 9.26 | 123 |
| 13.00 | 6.81 | 39 |
| 14.08 | 6.29 | 13 |
| 15.90** | 5.57 | 23 |
| 16.17 | 5.48 | 32 |
| 17.88 | 4.96 | 29 |
| 20.75 | 4.28 | 100 |
| 23.31 | 3.82 | 13 |
| 25.14 | 3.54 | 32 |
| 26.16 | 3.41 | 35 |
| 26.66* | 3.34 | 48 |
| 27.90 | 3.20 | 10 |
| 28.36 | 3.15 | 13 |
| 30.93 | 2.891 | 61 |

**Believed to be extraneous to SSZ-13 structure
*Attributed to quartz

Examples 3–9

Using the procedure of Example 2, a series of experiments was performed to make SSZ-13. In Examples 3, 4, and 7–9, the organic templating species was N,N,N-trimethyl-1-adamantammonium iodide; in Example 5, N-methyl-3-quinuclidinol iodide; and in Example 6, N,N,N-trimethyl-2-ammonium exonorbornane. The quantities of reactants used are given in Table 5. The pH of the reaction mixture was above 12.

TABLE 5

| | Example | | | | | | |
|---|---|---|---|---|---|---|---|
| | 3 | 4 | 5 | 6 | 7 | 8 | 9 |
| Solution 1 | | | | | | | |
| Sodium Silicate, g | 5 | 25 | 4.5 | 4.5 | 90 | 5 | 5 |
| H$_2$O, ml | 6 | 30 | 5.6 | 5.6 | 108 | 6 | 6 |
| Template, g | 1.17 | 7.8 | 2.31 | 2.42 | 18 | 1.0 | 1.0 |
| Solution 2 | | | | | | | |
| H$_2$O, ml | 6 | 30 | 7.7 | 7.7 | 108 | 6 | 6 |
| Al$_2$(SO$_4$)$_3$.16H$_2$O, g | 0.24 | 1.20 | 0.24 | 0.24 | 12 | 0.24 | 0.24 |
| Conc. NaOH, g | 0.67 | 3.35 | 0.67 | 0.67 | 18.66 | 0.64 | 0.64 |
| Time, days | 6 | 6 | 6 | 6 | 6 | 6 | 6 |
| Temperature, °C. | 140 | 140 | 140 | 140 | 140 | 130 | 120 |

X-ray diffraction patterns, obtained using a Siemens X-ray Diffractometer with CuK$_2$ radiation, showed that the products of Examples 3–5 were predominantly SSZ-13. The product of Example 6 was about 50% SSZ-13, contaminated with impurities including cubic zeolite P, magadiite, kenyaite, and minor unknown components. The product of Examples 3 and 5 contained the same minor impurities as the product of Example 2. The products of Examples 7 and 8 were substantially all SSZ-13. The product of Example 9 was chabazite and an impurity.

Example 10 (2661)

Six ml of water, 5.17 grams of Ludox AS-30 (30% SiO$_2$, colloidal; stabilized by <1% NH$_4$OH), and 2.08 grams of N,N,N-trimethyl-1-adamant ammonium iodide were combined. Six ml of water, 0.41 gram of Al$_2$(SO$_4$)$_3$.18H$_2$O and 1.43 grams of concentrated (50%) NaOH were mixed and added to the first solution. The combination of both solutions, a thin gel, was poured into a teflon cup and capped. The cup was placed in a Parr 4745 stainless steel pressure vessel and the vessel was sealed. The reactor vessel was heated at 150° C. for six days, with tumbling at 30–45 rpm. Then, the reactor was cooled and opened, and the solid contents were washed several times with water on a Buechner funnel. The X-ray diffraction pattern, as shown in Table 6, was that of as-prepared SSZ-13. Also shown in Table 6 are X-ray diffraction patterns for chabazite, zeolite K-G, zeolite D, and zeolite R, as given by Breck. The hkl values in the first column are Miller indices based on the hexagonal form of the rhombohedral lattice.

Example 11

A portion (0.95 gram) of the product of Example 10 was placed in a muffle furnace and heated in two-hour increments at 93° C., 204° C., 316° C. and 427° C., then for one eight-hour increment at 538° C., and finally for one four-hour increment at 593° C. This calcination was carried out in a flowing atmosphere of 50% air, 50% nitrogen at 20 standard cubic feet per minute. The calcined material was white in appearance. The X-ray diffraction pattern for the material, as shown in Table 5, was that of calcined SSZ-13. The calcined SSZ-13 was ion-exchanged in about 200 ml of water with a large excess of NH$_4$NO$_3$ at 100° C. for two hours. The solids were filtered, and the same exchange-filtration procedure repeated three times. The resulting ammonium form of SSZ-13 was then subjected to calcination using the same procedure as described, except for omission of the four-hour increment at 593° C.

Example 12 (2782)

SSZ-13 was prepared from a reaction mixture containing potassium rather than sodium. A solution was prepared from 5.1 grams of Ludox AS-30, 2.0 grams of N,N,N-trimethyl-1-adamantammonium iodide, 12.1 ml of water, 0.4 gram of Al$_2$(SO$_4$)$_3$.18H$_2$O and 1.09 grams solid potassium hydroxide. The solution was poured into the teflon cup of a Parr 4545 reactor, and the reactor closed and sealed. The reactor was heated for six days at 150° C. under autogenous pressure while being rotated at 30 rpm. After cooling, the contents were filtered, and the solids were washed five times with water and once each with methanol and acetone. The resulting zeolite was dried in air. Its X-ray diffraction pattern was obtained and it is shown in Table 7. The product was found to be pure SSZ-13.

Example 13 (2282)

A portion of the product of Example 12 was calcined by a procedure identical to that described in Example 11. Its X-ray diffraction pattern was found to be as shown in Table 7.

TABLE 7

| SSZ-13 Example 12 (As-Prepared) | | | SSZ-13 Example 13 Calcined | | |
|---|---|---|---|---|---|
| 2θ | d/n | 100 I/I$_0$ | 2θ | d/n | 100 I/I$_0$ |
| 9.57 | 9.24 | 61 | 9.62 | 9.19 | 100 |
| 13.06 | 6.78 | 6 | 13.04 | 6.79 | 32 |
| 14.06 | 6.30 | 21 | 14.15 | 6.26 | 6 |
| 16.23 | 5.46 | 80 | 16.22 | 5.46 | 18 |
| 17.82 | 4.98 | 24 | 18.00 | 4.93 | 16 |
| 19.21 | 4.62 | 3 | 19.31 | 4.60 | 2 |
| 20.87 | 4.26 | 100 | 20.87 | 4.26 | 50 |
| 22.14 | 4.01 | 9 | 22.28 | 3.990 | 2 |
| 22.72 | 3.91 | 8 | 22.71 | 3.915 | 2 |
| 23.30 | 3.82 | 5 | 23.36 | 3.808 | 6 |
| 25.01 | 3.56 | 69 | 25.23 | 3.530 | 18 |
| 26.30 | 3.589 | 18 | 26.26 | 3.394 | 11 |
| 28.07 | 3.179 | 5 | 28.00 | 3.187 | 4 |
| 28.32 | 3.151 | 3 | 28.50 | 3.132 | 4 |
| 29.95 | 2.983 | 3 | 29.95 | 2.983 | 1 |
|  |  |  | 31.02 | 2.883 | 27 |
| 31.00 | 2.885 | 47 | 31.44 | 2.846 | 13 |
| 31.29 | 2.859 | 21 |  |  |  |

Example 14

To a solution of 0.48 g NaAlO$_2$, 4 g concentrated NaOH, and 19 ml water, 50 g of Ludox AS-30 (30% colloidal SiO$_2$; stabilized by <1% NH$_4$OH) was added while stirring vigorously. The thick mixture was heated to 90° C. and 15.05 g of N,N,N-trimethyl-1-adamantammonium iodide was added while the stirring was continued. After several minutes, the solution was poured into a 125 ml Parr Reactor, sealed, closed, and heated for 3 days at 180° C. and autogenous pressure. The reaction mixture relative molar composition was: 16 organic salt:4.3 Na$_2$O:Al$_2$O$_3$:85.5 SiO$_2$:1064 H$_2$O. The OH$^-$/SiO$_2$ mole ratio was 0.20. The product was filtered, washed, and dried. X-ray diffraction showed the prod-

TABLE 6

| hkl (Hexag.) | SSZ-13 Example 10 (As-Prepared) | | SSZ-13 Example 11 (Calcined) | | Chabazite | | Zeolite K-G | | Zeolite D | | Zeolite R | |
|---|---|---|---|---|---|---|---|---|---|---|---|---|
|  | d | 100 I/I$_0$ | d | 100 I/I$_0$ | d | 100 I/I$_0$ | d | 100 I/I$_0$ | d | 100 I/I$_0$ | d | 100 I/I$_0$ |
| 101 | 9.24 | 41 | 9.20 | 100 | 9.35 | 50 | 9.45 | MS | 9.42 | 66 | 9.51 | 88 |
| 110 | 6.78 | 5 | 6.79 | 46 | 6.89 | 10 | 6.94 | m | 6.89 | 67 | 6.97 | 35 |
| 012 | 6.30 | 18 | 6.26 | 8 | 6.38 | 5 |  |  |  |  |  |  |
| 021 | 5.47 | 77 | 5.46 | 28 | 5.55 | 9 | 5.55 | vw | 5.59 | 15 | 5.61 | 26 |
| 003 | 4.98 | 21 | 4.93 | 25 | 5.02 | 30 |  |  | 5.03 | 62 | 5.10 | 45 |
| 211 | 4.26 | 100 | 4.26 | 77 | 4.32 | 76 | 4.32 | s | 4.33 | 62 | 4.37 | 78 |
| 113 | 4.02 | 9 | 3.986 | 3 | 3.98 | 2 | 3.95 | ms | 3.98 | 27 | 4.02 | 14 |
| 300 | 3.921 | 8 | 3.921 | 3 | 3.870 | 28 |  |  | 3.89 | 23 | 3.92 | 35 |
| 104 | 3.560 | 42 | 3.530 | 27 | 3.590 | 23 |  |  | 3.60 | 12 | 3.63 | 41 |
| 220 | 3.392 | 20 | 3.399 | 18 | 3.448 | 13 |  |  | 3.45 | 39 | 3.48 | 25 |
| 131 | 3.187 | 5 | 3.187 | 5 | 3.190 | 5 | 3.18 | mw | 3.19 | 15 | 3.21 | 18 |
| 401 | 2.887 | 47 | 2.888 | 40 | 2.925 | 100 | 2.93 | vs | 2.94 | 100 | 2.95 | 100 |
| 214 | 2.860 | 18 | 2.845 | 19 | 2.890 | 30 |  |  |  |  | 2.89 | 16 | uct to be about 50% SSZ-13; the remainder of the product was quartz, kenyaite, and magadiite.

Example 15

The zeolite of Example 7 was tested for cracking activity using n-hexane and 3-methylcyclopentane. At 427° C. (800° F.) and LHSV of 1.0, the conversion was 16% and the constraint index was calculated to be greater than about 38. The zeolite of Example 4 was tested for cracking activity with n-hexadecane at 427° C., and LHSV of 3; conversion of 5% was primarily to $C_4^-$ product. The zeolites of Examples 2 and 3 were tested for activity in a pulsed cracking unit using an Escravos feed rich in n—$C_{19}$—$C_{24}$ paraffins. At 510° C., the conversion with the zeolite of Example 2 was 10% and with the zeolite of Example 3 was 40%; their product was primarily $C_4^-$ gases.

Example 16

The product of Example 7 was tested for cracking activity on a feed of n-hexadecane. The test zeolite was impregnated to a level of 1 wt. % platinum. The reaction conditions included 1000 psig $H_2$ (1014.7 psia; 70 bar), 454° C. (850° F.) and LHSV of 5 (based on mass). The conversion of n-hexadecane was 77%. The product ratios of iso to normal paraffins were:

| | |
|---|---|
| iso $C_4$/n $C_4$ | 0.34 |
| iso $C_5$/n $C_5$ | 0.36 |
| all iso $C_6$/n $C_6$ | 0.39 |

These ratios are characteristic of a small pore zeolite.

Example 17

Element ratio determinations were carried out for some of the products after converting the zeolites into their acidic form. The conversion was achieved for the products of Examples 2–6 by first calcining the zeolite under $N_2$ in a stepped temperature cycle at 3 hours at 200° F., 2 hours at 400° F., 2 hours at 600° F., 2 hours at 800° F., and finally 2½ hours at 940° F. Small amounts of air were admitted to the nitrogen stream beginning at 600° F. Next, the zeolites were ion exchanged three times with $NH_4NO_3$ or $NH_4O_2CCH_3$. In each ion exchange treatment, a molar excess of $NH_4^+$ to zeolite sites was used. A mixture of 25 ml saturated ammonium solution per 0.5 g zeolite was formed, followed by heating the mixture to 100° C. in a closed system for 2 to 4 hours. After drying the zeolite after the third exchange treatment, it was calcined using the stepped temperature program described above. $SiO_2/Al_2O_3$ ratios, and percent $Na_2O$ were determined by electron microprobe analysis. Results are shown in Table 8.

TABLE 8

| | Example | | | | | |
|---|---|---|---|---|---|---|
| | 2 | 3 | 4 | 5 | 6 | 11 |
| $SiO_2/Al_2O_3$ | 10.8 | 12.6 | 12.4 | 9.6 | — | 28 |
| % $Na_2O$ | 0.71 | 0.57 | 0.60 | 1.1 | — | — |

What is claimed is:

1. A zeolite having a mole ratio of an oxide as synthesized selected from the group consisting of silicon oxide, germanium oxide and mixtures thereof to an oxide selected from the group consisting of aluminum oxide, gallium oxide, and mixtures thereof greater than 5:1, and having the X-ray diffraction pattern of Table 1.

2. A zeolite having a composition, as synthesized and in the anhydrous state, in terms of mole ratios of oxides as follows: (0.5 to 1.0)$R_2O$:(0 to 0.50)$M_2O$—$W_2O_3$: (greater than 5) $YO_2$ wherein M is an alkali metal cation, W is selected from the group consisting of aluminum, gallium and mixtures thereof, Y is selected from the group consisting of silicon, germanium and mixtures thereof, R is a quaternary lower alkylammonium cation compound selected from the group consisting of N-alkyl-3-quinuclidinol, N,N,N-tri-alkyl-1-adamantammonium, and N,N,N-trialkyl-exoaminonorbornane, or mixtures thereof, and having the X-ray diffraction pattern of Table 1.

3. A zeolite according to claim 2 wherein W is aluminum and Y is silicon.

4. A zeolite prepared by calcining the zeolite of claim 3, at a temperature from about 200° C. to 820° C. and having the X-ray diffraction lines of Table 2.

5. A zeolite according to claim 1, 2, 3 or 4 which has undergone ion exchange with hydrogen, ammonium, rare earth metal, Group IIA metal, or Group VIII metal ions.

6. A zeolite according to claim 1, 2, 3 or 4 wherein rare earth metals, Group IIA metals, or Group VIII metals are occluded in the zeolite.

7. A zeolite of matter, comprising the zeolite of claim 1, 2, 3 or 4 and an inorganic matrix.

8. A method for preparing the zeolite of claim 2, comprising:
   (a) preparing an aqueous mixture containing sources of an organonitrogen compound, an oxide selected from the group consisting of aluminum oxide, gallium oxide, and mixtures thereof, and an oxide selected from silicon oxide, germanium oxide, and mixtures thereof the aqueous mixture having the following composition in terms of mole ratio of oxides:

$YO_2/W_2O_3 = 5$–350
   $M_2O/W_2O_3 = 0.5$ to 20
   $R_2O/W_2O_3 = 0.5$–40 wherein R is a quaternary lower alkylammonium cation compound selected from the group consisting of N-alkyl-3-quinuclidinol, N,N,N-trialkyl-1-adamantammonium, and N,N,N-trialkyl-2-exoaminonorbornane or mixtures thereof, Y is silicon, germanium, or mixtures thereof, W is aluminum, gallium, or mixtures thereof;

(b) maintaining the mixture at a temperature of at least 100° C. until the crystals of said zeolite form; and (c) recovering said crystals.

9. The method of according to claim 6 wherein Y is silicon, and said source of silicon oxide is an aqueous colloidal suspension of silica.

10. The method according to claim 6 wherein Y is silicon, said source of silicon oxide is a solution of a silicon salt, and said aqueous mixture has a mole ratio of OH:$SiO_2$ of greater than 0.95:1.

* * * * *

UNITED STATES PATENT AND TRADEMARK OFFICE
CERTIFICATE OF CORRECTION

PATENT NO. : 4,544,538
DATED : October 1, 1985
INVENTOR(S) : Stacey I. Zones

It is certified that error appears in the above-identified patent and that said Letters Patent are hereby corrected as shown below:

Claim 1, Col. 14, Line 3, "greater than 5:1" should read --greater than 15:1--.

Signed and Sealed this

Eleventh Day of February 1986

[SEAL]

Attest:

DONALD J. QUIGG

Attesting Officer

Commissioner of Patents and Trademarks